United States Patent Office 3,383,168
Patented May 14, 1968

3,383,168
METHOD OF ION EXCHANGING CRYSTALLINE ALUMINOSILICATES
Stephen M. Kovach, Highland, Ind., assignor to Sinclair Research, Inc., New York, N.Y., a corporation of Delaware
No Drawing. Filed Apr. 15, 1965, Ser. No. 448,258
3 Claims. (Cl. 23—111)

ABSTRACT OF THE DISCLOSURE

Crystalline aluminosilicate materials are ion exchanged using liquid ammonia as the ion exchange medium. Less desirable cations, e.g. alkali metal cations are replaced by ion exchange with a solution of more desirable cations, e.g. cerium, in the liquid ammonia medium.

This invention relates to a method for conducting an ion-exchange operation and in particular concerns the preparation of catalytic materials. Ion exchange processes, insofar as heretofore known, have used water as the medium for bringing a desired ion into contact with a solid having ion exchange capabilities which contains a less-desirable, exchangeable ion. The process of this invention avoids the use of water in ion exchange and by avoiding such use provides a number of advantages, particularly when the materials ion-exchanged are to be used in catalytic processes. Where these processes involve organic reagents and/or products it often is desired to have the ion-exchange material in a state where it contains minimum free water. In the method of this invention, free water can be removed from the ion exchange material during the ion exchange process. Also, where crystalline alumino-silicates are to be used in high-temperature hydrocarbon conversion processes such as cracking this invention avoids the need for additional calcination after ion exchange treatment.

The use of decationized or ion-exchanged crystalline alumino-silicates as cracking catalysts has become of increasing interest. Often these crystalline alumino-silicates are derived from natural materials such as analcite, brewsterite, cancrinite, chabazite, clinoptilolite, datolite, erionite, faujasite, ferriorite, flakite, gmelinite, harmotome, heulandite, leucite, lazurite, mesolite, mordenite, natrolite, noselite, paulingite, phillipsite, ptilolite, scapolite, sodalite, scolecite, etc. These minerals usually contain sodium or potassium cations which are removed before use in catalysis.

In addition, synthetic crystalline alumino-silicate ion-exchange materials have been prepared and are sold under trade-names such as "Zeolite A," "Zeolite X," "Zeolite Y," etc. The materials are usually made by precipitation from aqueous solutions of aluminum, silicon and alkali metal compounds. The precipitate generally is aged for one or more days to allow crystallization to occur. A typical formula for these synthetic zeolites is

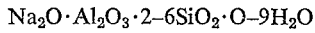

$Na_2O \cdot Al_2O_3 \cdot 2\text{--}6SiO_2 \cdot O\text{--}9H_2O$

Synthetic zeolites also may be made by treating certain clays with aqueous caustic solution. These alumino-silicates usually are treated, generally by heat calcination, to remove free water and in many cases some combined water, before being used.

Organic ion-exchange resins are known and are widely used. Typical of such resins are the polystyrene cross-linked divinyl-benzene sulfonates, but many more types are known and are commercially available. Many of these, when in the hydrogen form and of reduced water content may be used in catalytic processes such as described in U.S. Patent 3,031,495.

All of these ion-exchange materials often are available commercially in the sodium, potassium or other form undesirable in catalytic uses. It is known to decationize an organic ion-exchange material by treatment with a concentrated aqueous acid solution whereby the hydrogen cations of the acid replace all or part of the undesired alkali metal ions. In the case of crystalline alumino-silicates, which usually are sensitive to aqueous acids, the treatment is generally with an aqueous solution of an ammonium or organic ammonium derivative salt, often ammonium nitrate. In the case of materials which have been treated for water-removal previously, this means that the water-removal step must be repeated, an economically disadvantageous treatment. Removal of water from the decationized crystalline alumino-silicate usually requires holding the material for a certain minimum time at a relatively high temperature. Organic ion exchange materials are usually sensitive to heat and the removal of free water from such materials often will require the resin to be refluxed in benzene or other liquid which forms an azeotrope with water.

In this invention liquid ammonia is used as the ion exchange medium, preferably in a substantially anhydrous state. Undesired cations in the solid ion exchange material can be removed in favor of more desirable cations by providing a solution of such cations in the ammonia. Many metals will dissolve in ammonia with the formation of amides. Such metals as cerium, cesium, chromium, ion, lanthanum, lithium, magnesium, palladium, polonium, tantalum, tin, zinc, zirconium, etc., dissolve readily in liquified ammonia when provided in a finely divided form. Also, most ammine complex salts, such as the ammine sulfates of cadmium, copper, mercury, nickel, platinum and silver will dissolve in liquid ammonia to provide exchangeable cations in the solution. It is important, of course, in preparing catalysts not to employ materials which will poison or otherwise lessen the usefulness or efficiency of the catalyst. It is also possible to contact the solid with liquid ammonia alone for a period of time sufficient to replace a significant amount of alkali metal cations with ammonium cations and then remove the solid from the liquid ammonia, allowing the solid to come to ambient conditions to remove the entrained ammonia and, if desired, to heat the solid to decompose the ammonium cations to form hydrogen ions. Accordingly, it is not necessary that any cation other than ammonium ion be used.

When ammonia is used as the ion-exchange medium, high pressure or low temperature (below about −40° F.) or both may be used to liquify the ammonia. Then the elemental metal or the ammine complex of metal to appear in the finished product is dissolved in the ammonia and the ion-exchange material is added. When a suitable amount of time has expired, say about 30 minutes to several hours, the liquid ammonia may be decanted from the solid slurry and kept in liquified form for reuse. This decanted ammonia may require treatment, every once in a while, for removal of water absorbed from the ion-exchange material. The slurry of ion-exchange material is freed from entrained ammonia by merely subjecting it to ambient conditions. It is then ready to be treated for ammonium ion decomposition, if necessary, and/or to be directly used in catalytic or other processes.

The following example of the process of this invention is to be considered illustrative only and not limiting.

EXAMPLE

To 100 ml. of liquid ammonia, cooled to −40° F., in a three-necked flask equipped with a Dry Ice-acetone condenser, mechanical stirrer, thermowell-thermometer, and withdrawal stopcock at the bottom of the flask, is slowly added 5 g. of finely divided cerium. To the mixture of cerium-cerium amide in liquid ammonia is slowly added, while stirring, 100 ml. of the sodium form of a "13X" type synthetic crystalline sodium alumino-silicate. Contact between the ammonia solution and the solid material is maintained for about an hour.

At the end of this period, the liquid ammonia is drained off and the exchange solid is allowed to warm to room temperature. At room temperature, all the solvent has been removed with the exception of the ammonium ions chemically bound to the ion exchange material. These are converted to hydrogen when the crystalline material is brought to higher temperatures. The resulting material, when used in a hydrocarbon cracking catalyst, produces excellent results.

It is claimed:

1. A method for conducting an ion-exchange reaction which comprises contacting a solid alkali metal crystalline aluminosilicate having an undesired cation with a solution of a more desired cation in liquid ammonia.

2. The method of claim 1 in which the cation dissolved in the liquid ammonia is cerium.

3. A method for decationizing a solid alkali-metal crystalline alumino-silicate which comprises contacting the solid with liquid ammonia for a period of time sufficient to replace a significant amount of alkali-metal cations with ammonium cations, removing the solid from the liquid ammonia, allowing the solid to come to ambient conditions to remove entrained ammonia and heating the solid to decompose ammonium cations.

References Cited

UNITED STATES PATENTS

| 3,130,006 | 4/1964 | Rabo et al. | 23—111 X |
| 3,140,252 | 7/1964 | Frilette et al. | 23—455 X |

OTHER REFERENCES

Keenan et al., "J. Am. Chem. Soc.," vol. 75, p. 6348 (1953).

EDWARD J. MEROS, *Primary Examiner.*